(No Model.) 4 Sheets—Sheet 1.
J. S. HAND.
TAILOR'S MEASURING DEVICE.
No. 299,383. Patented May 27, 1884.
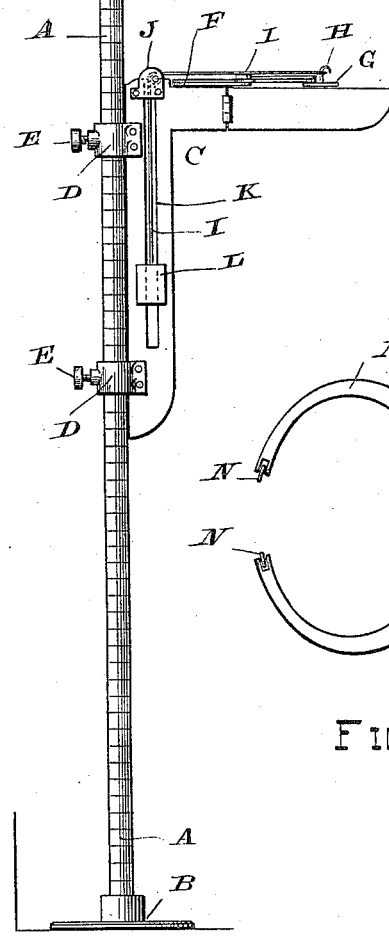
FIG. 1.
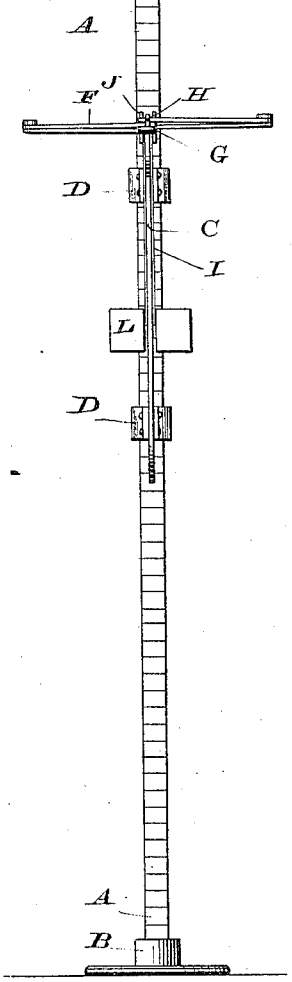
FIG. 2.
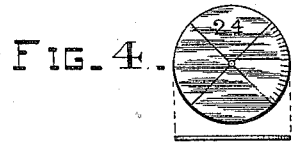
FIG. 3.
FIG. 4.
WITNESSES—
Wilmer Bradford
Herbert DeVall
INVENTOR—
John S. Hand
By C. W. M. Smith
Attorney (No Model.)  4 Sheets—Sheet 3.
J. S. HAND.
TAILOR'S MEASURING DEVICE.
No. 299,383.  Patented May 27, 1884.

(No Model.) 4 Sheets—Sheet 4.

J. S. HAND.
TAILOR'S MEASURING DEVICE.

No. 299,383. Patented May 27, 1884.

Witnesses

Inventor

UNITED STATES PATENT OFFICE.

JOHN S. HAND, OF SAN FRANCISCO, CALIFORNIA.

TAILOR'S MEASURING DEVICE.

SPECIFICATION forming part of Letters Patent No. 299,383, dated May 27, 1884.

Application filed October 4, 1883. (No model.)

*To all whom it may concern:*

Be it known that I, JOHN S. HAND, a subject of the Queen of Great Britain, and residing at San Francisco, in the county of San Francisco and State of California, have invented a new and useful Tailor's Measuring Device, of which the following is a specification.

My invention relates to an improved measuring device for the use of tailors in taking measurements for wearing-apparel, and also to means for quickly and easily transferring the measurements to the pattern; and it consists, first, of a try-square sliding or mounted upon a vertical rod, and provided with a lazy-tongs carrying a graduated tape, by means of which the distance of the outer point of the lazy-tongs from the vertical standard may be ascertained; second, of a series of disks or circular plates having a portion of their circumference provided with a scale, and adapted more particularly for use in laying out the pattern.

Figure 5:
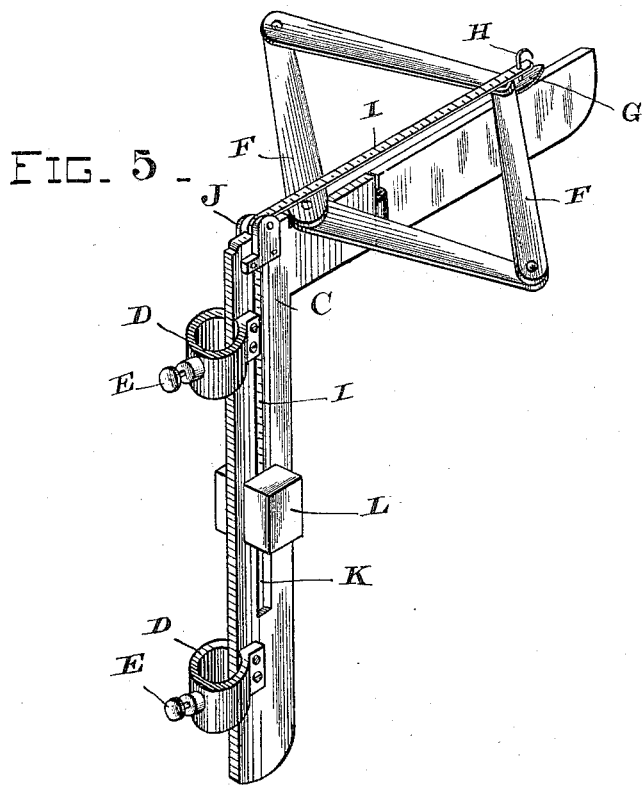
Figure 6:
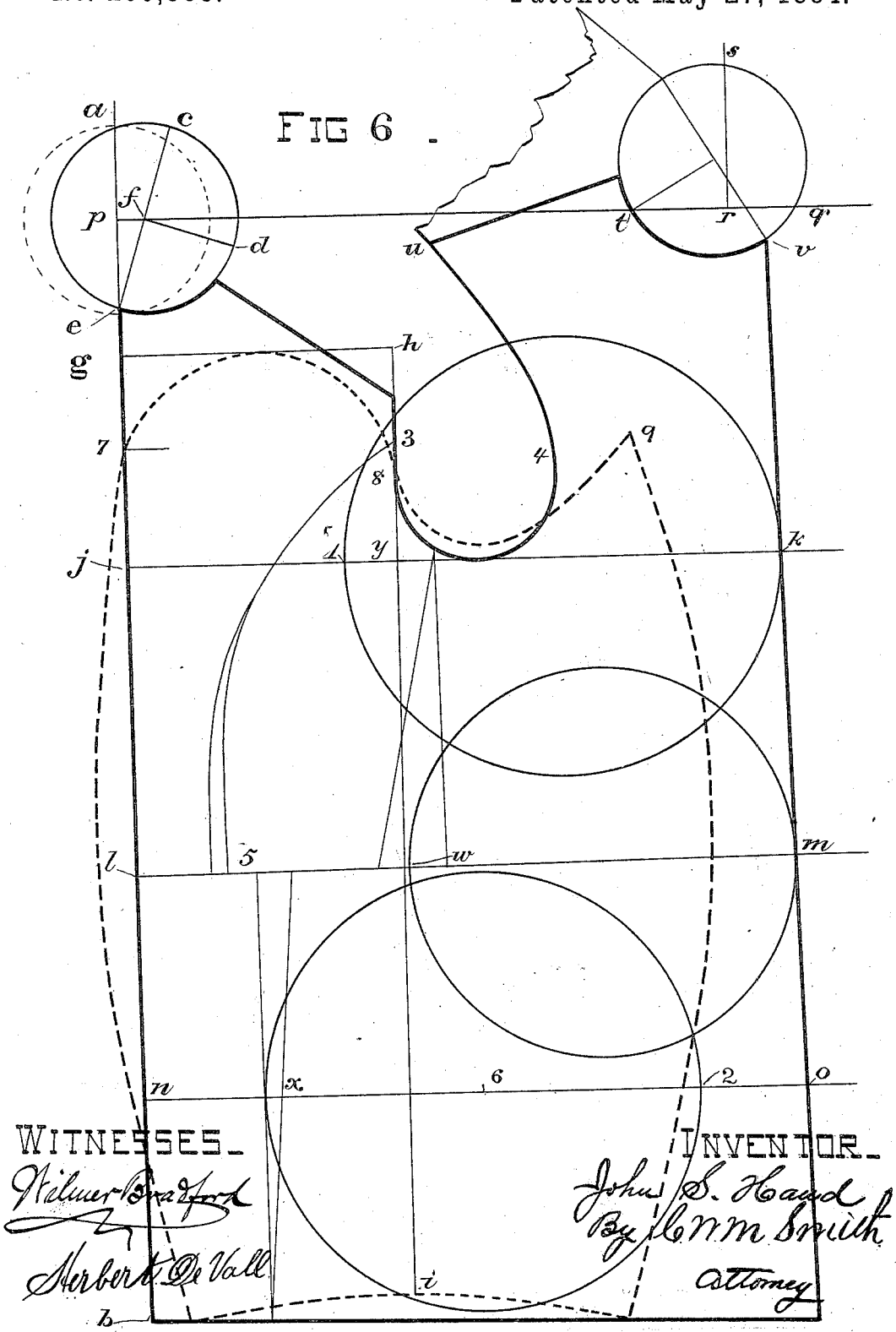
Figure 7:
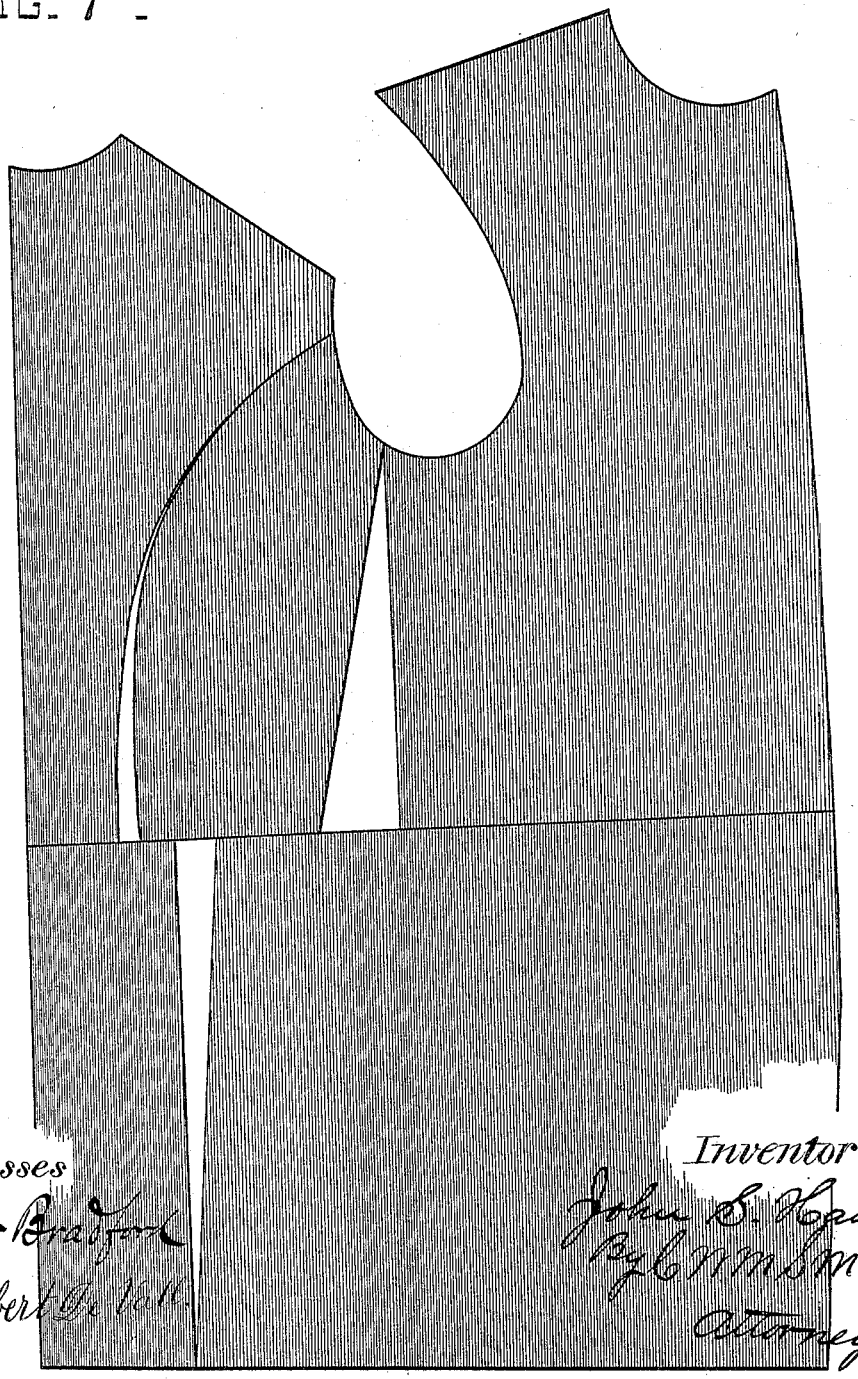

In the drawings which are hereunto annexed, and which form part of this specification, Figure 1 is a side view of the device for taking vertical measurements; and Fig. 2 is a front view of the same. Fig. 3 is a plan view of the calipers, and Fig. 4 represents in plan and edge view one of the disks. Fig. 5 is a perspective view of the sliding try-square and lazy-tongs. Fig. 6 is a diagram illustrating the mode of laying out the pattern of a coat. Fig. 7 represents the pattern as cut out.

Similar letters of reference are used to indicate like parts throughout the several views.

For the purpose of obtaining the heights or vertical measurements and the horizontal projections of the various portions of the figure from a given vertical line, I employ the device illustrated in Figs. 1 and 2, and which consists, essentially, of a vertical graduated rod, A, secured to the floor and at the top by socketed plates B B, and having mounted upon it the sliding try-square C. The vertical arm of this try-square is furnished with grommets or collars D D, having set-screws E E, by which the square is clamped to the rod at any desired height. The horizontal arm of the square is provided with a hinge-joint, as shown in Figs. 1 and 5, for a purpose to be hereinafter set forth. Upon the upper edge of the horizontal arm of the square, and between the hinge-joint and the inner corner or juncture of the two blades, I pivot the lazy-tongs F, having upon its forward or outer end an index or pointer, G, to which is attached, by a pin or hook, H, a graduated measuring-tape, I. This tape passes backward and over a small pulley attached to the inner portion of the horizontal arm or blade by journal-bearing plates J J, and thence downward within an open-ended slot, K, formed in the vertical blade or arm, and is kept taut by a weight, L, attached to its lower end. The corner of the try-square is mitered or rounded off somewhat, so as to bring the upper end of the vertical blade on a horizontal line with the index or pointer G, in order that the height of the pointer from the floor-line may be accurately indicated upon the vertical rod.

The calipers M (shown in Fig. 3) are used for the purpose of taking the diameters of various portions of the arms and legs, and also of the body. They are formed with a backward extension of the legs, one of which is provided with a graduated arc, and the other with a pointer, by which the measure taken may be indicated, and read at sight without the trouble of laying the caliper-points upon a separate scale for the purpose of determining their distance apart. The point of each leg is slitted to receive a small friction-roller, N, which permits the calipers to be easily slid over the clothing of the person being measured without catching in fibers of the fabric. These calipers, however, I do not claim at present, as they may be made the subject of a separate application for patent.

The circular disks, one of which is illustrated in Fig. 4, are made of various diameters, and in any required number. The circumference of each disk in inches or other convenient measure is, for convenience, marked, stamped, or printed upon both faces of the disk in plain figures, and the disk is also marked by two lines which cross each other at right angles at the center of each face, as shown in Fig. 4. One-quarter of the edge of each disk is graduated or provided with a scale. These disks are used in laying out the pattern and represent the cross-sections, circumference, or diameter taken at or pertaining to the various portions of the human body, at which the vertical measurements are taken. It will be understood that I do not claim these disks at present, as they may be made the subject of a separate application.

Having thus described the instruments used by me in measuring the form or body and laying out the pattern, I will now proceed to describe the manner of taking the actual measurements, and transferring the same to the pattern, selecting for the purpose of illustration a coat, although the same general principle is to be applied to the laying out of all garments of whatsoever name or shape.

The person whose measure is to be taken stands with his back to the standard A, and the hinged blade of the try-square is turned back out of the way, so as to allow the point of the lazy-tongs to be touched to the person's body. The try-square is first run up the vertical standard A until the index or pointer G of the lazy-tongs is in line with the collar seam. The height of said pointer from the base or floor line will be indicated by the scale upon the vertical standard, and the distance to which the pointer is projected outwardly will be indicated by the scale upon the weighted tape I. I next ascertain in the same manner the height of the shoulder by swinging the points of the lazy-tongs to the right or left, as the case may be, and then the depth of scye, the height of the natural waist, and the height of the most prominent point of the seat. In all these measurements the horizontal projection of the point of the lazy-tongs is noted and marked down. I next obtain the length of the sleeve by lowering and swinging the lazy-tongs to the required length of sleeve desired. Next, let the person face to the right about, and take the depth of the "front neck," and then, with the inch-tape, take the size of the neck or shirt collar, the measure around the chest, the measure around the waist, and around the seat. The depth of the chest is taken by means of the calipers, the measure being indicated by the pointer thereon.

In taking the measurements for the pants, the person stands with his side toward the standard A, and, running out the lazy-tongs, the height of the waistband is taken, and the horizontal projection of the pointer G is also taken note of. Then I take the seat-measure the height of thigh, the height of the knee, and, lastly, the bottom. For convenience, when pantaloon-measures are being taken, the man stands on a small block. The lazy-tongs are allowed to go back, and the horizontal arm of square is straightened out and the leg-seam measure is taken. The calipers are now used to determine the width of the hips; also the width of both thighs, knees, calves, and shins from outside to outside. Next, with the inch-tape, I take the measure around the smallest part of waist, then around the largest part of seat, close measure to determine the exact size around the thigh, exact size of knee-measure, the calf-measure, and around the shin above the ankle. Now measure the fashionable width of pantaloons around the leg, and the measurements are completed.

For drafting the coat I draw line $a\ b$ for a base-line, and take the disk whose circumference equals the circumference of the neck, and place the center of the disk on the line $a\ b$. Now find the difference between the height of neck at back and front, and swing the disk to the right, using the lower end of the vertical cross-line marked upon the disk as a pivot, for a distance equal to the difference between the front and back neck-measures, and mark the point $c$. Now mark the point $d$ at right angles to the vertical cross-line on the disk, and then draw the line $e\ c$. Then draw a line from the point $d$, bisecting the line $e\ c$ at the point $f$, which point represents the center of the neck, and a circle having the radius $f\ d$, with $f$ as the center, is drawn upon the paper. Establish the height of shoulder at the point $g$, and draw line $g\ h$, making the distance from $g$ to $h$ equal to one-half the depth of chest, and one-third of the difference between the depth of chest and one-half the circumference of chest-measure. From $h$ draw the line $h\ y$ parallel with the base-line. Next establish the point $j$, which is the height of the scye, and draw line $j\ k$. Next establish the point $l$, which is the height of the natural waist, and draw line $l\ m$. Next establish the point $n$, which is the height of the largest part of seat, and draw the line $n\ o$. Now establish the line $p\ q$, which is the height of the shoulder, and lay off on it a distance twice the depth of the chest-measure, and mark the point $r$. Now form the back to suit the taste. Cut out the back, leaving the inner half of the upper or neck circle, $e\ d\ c$, attached thereto. From $r$ draw the line $r\ s$ at right angles to the line $p\ r$, place the point $f$ on point $r$ and line $e\ c$ or line $r\ s$, make a pivot of $t$, and close shoulder-seam at the point $u$, letting the point $u$ drop as much below line $p\ q$ as point of shoulder of back drops below $h$, and sweep circle forming the lower half of neck through $t$ to $v$. From $j$ to 1 measure in the distance indicated by the lazy-tongs, (for the distance from the center of back to the standard A,) and from 1 to $k$ lay off the depth of chest-measure. Place the edge of the disk which represents the breast-measure at $k$, the center of the disk being on line $j\ k$, allowing the edge of the circle or disk to pass over point 1, as it will. Lay off the distance from $l$ to $w$ indicated by the lazy-tongs for the distance of the natural waist from the standard A, and place the edge of the disk representing the waist-measure thereon with the center of the disk on line $l\ m$, and draw a line around the disk. Measure in from $n$ to $x$ the distance indicated by the lazy-tongs for the distance of the seat from the standard A. Then measure from $x$ to 2 the width of hips, placing the edge of the disk which represents the circumference of the seat at 2 with the center of the disk on line n o, and draw a line around the disk. Now draw lines v, k, m, and o, and form the breast. Point 3 is half-way the distance between g and j. From 3 to 4 is one-half inch more than one-third the difference between depth of chest and the circumference thereof. Now form scye from u to 4, touching line j k at bottom, and continue up to 3. Take out at 5 the horizontal difference indicated by the lazy-tongs between the measurements taken at the points j and l. Establish the side body-seam and take out at w the difference remaining between the breast and waist measure. At the center of the circle representing the seat-measure mark the point 6, and measure from 6 toward x one-half the seat-measure less the width of back at point l, and complete the coat to the required style and length.

To form the sleeve, find point 7 one-half the distance between g and j, carrying the sleeve-head up to the center of line g h, and passing around by 3 to 8, which is one-half the distance between 3 and y, and complete sleeve by drawing line 8 i, and measure half the scye around from 8 to 9, which gives the under sleeve. 9 is the same distance above line j k as 7 is above the point j. Make width of sleeve at wrist and elbow to suit the taste.

Having thus described my invention and the manner in which the same is to be applied to the laying out of patterns for wearing-apparel, what I claim, and desire to secure by Letters Patent, is—

A tailor's measuring device consisting of a fixed vertical graduated rod, upon which is adjustably secured the try-square C, for the purpose of obtaining vertical measurements, and the lazy-tongs F, pivoted upon said try-square, and provided with a weighted measuring-tape to determine the projection of the point of the lazy-tongs when taking horizontal measurements therewith, substantially as shown, and for the purpose set forth.

In testimony that I claim the foregoing I have hereunto set my hand and seal.

JOHN S. HAND. [L. S.]

Witnesses:
WILMER BRADFORD,
J. E. HAMILL.